Dec. 10, 1946.  F. L. WASSELL  2,412,238
PRODUCTION CONTROL BOARD
Filed Aug. 13, 1942  4 Sheets-Sheet 1
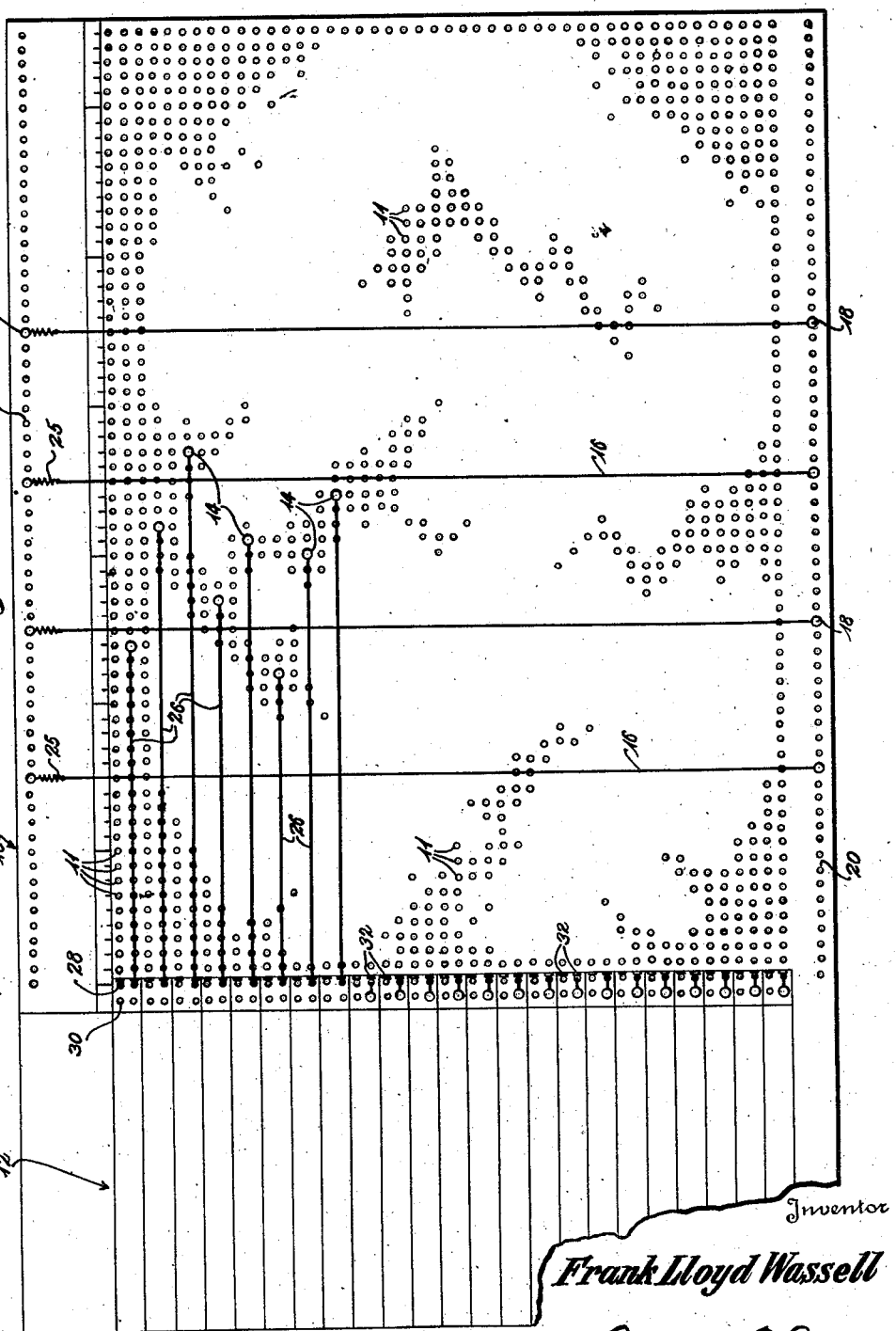
Inventor
Frank Lloyd Wassell
By Bacon & Thomas
Attorneys

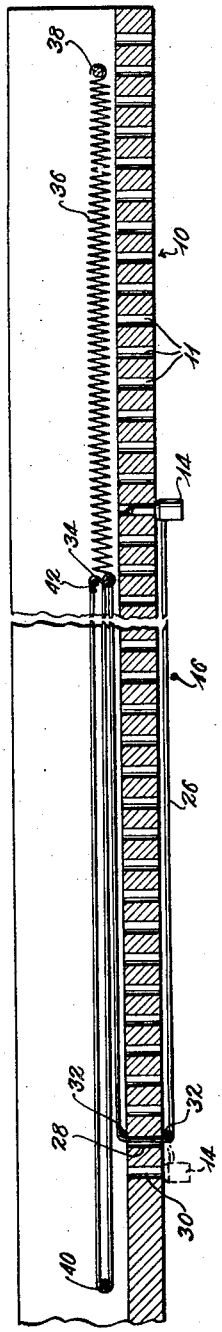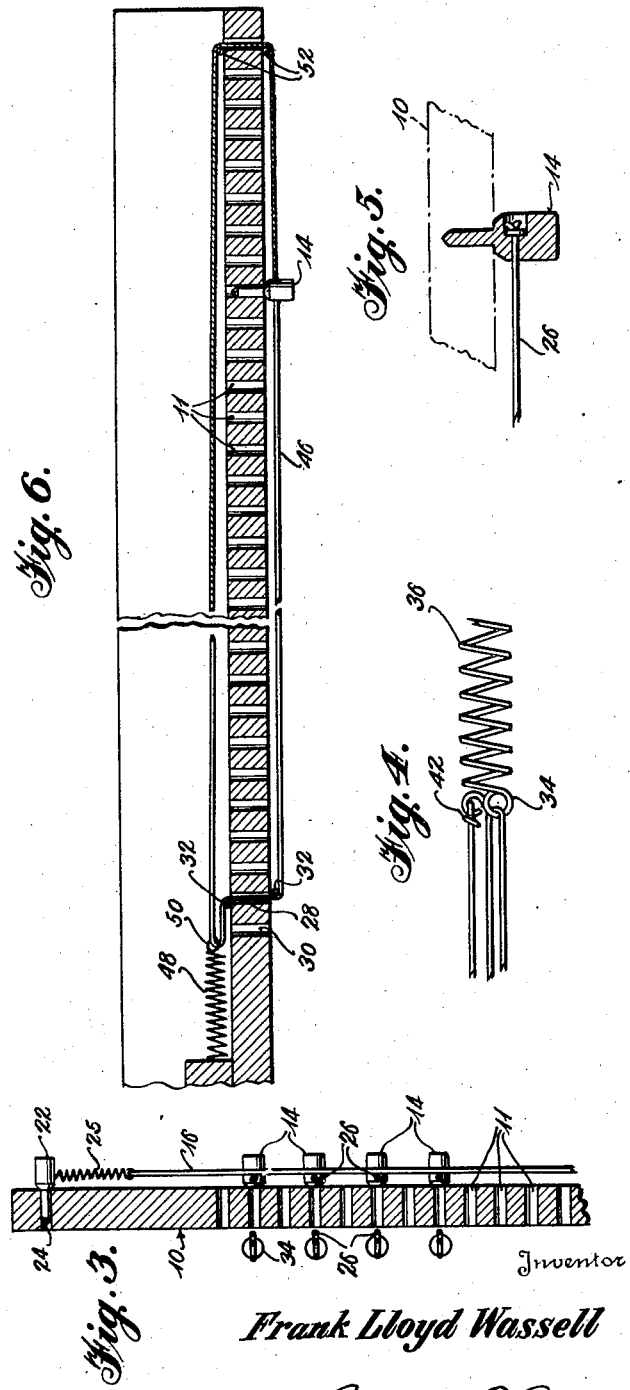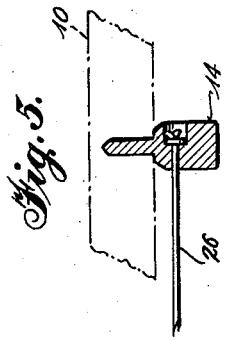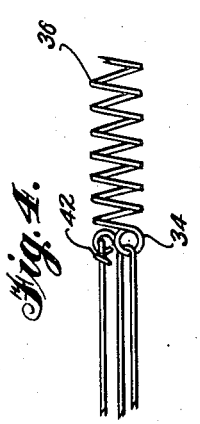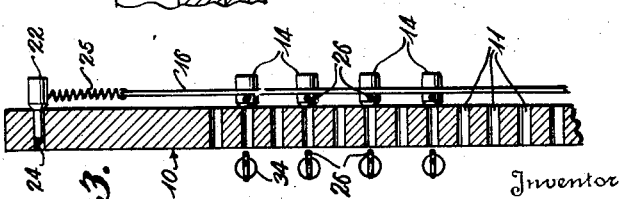

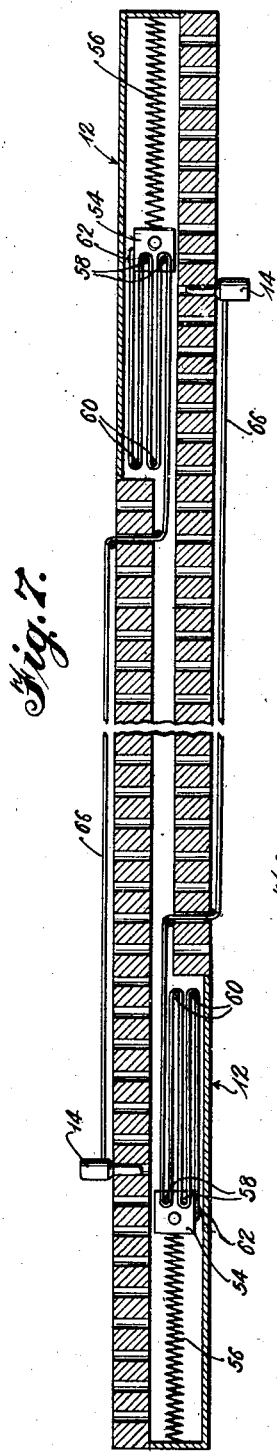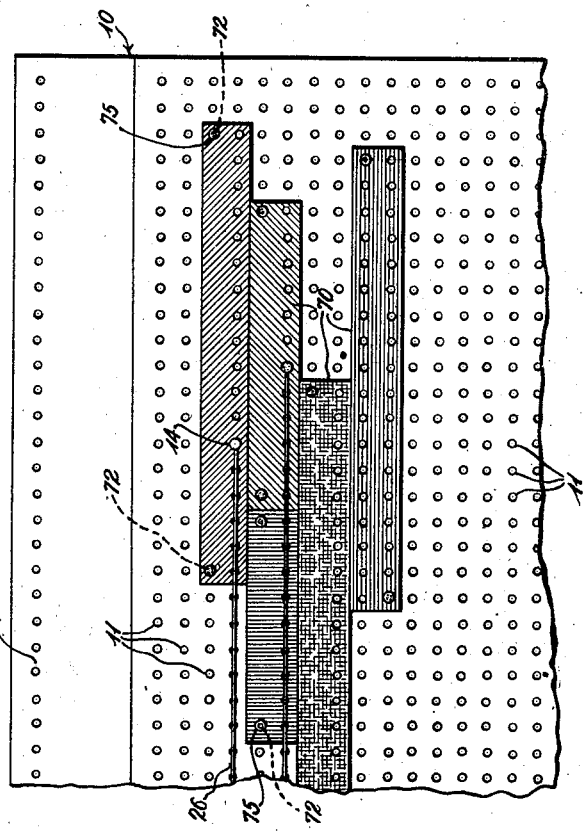

Dec. 10, 1946.　　　F. L. WASSELL　　　2,412,238
PRODUCTION CONTROL BOARD
Filed Aug. 13, 1942　　　4 Sheets-Sheet 4

Inventor
*Frank Lloyd Wassell*

By *Bacon & Thomas*
Attorneys

Patented Dec. 10, 1946

2,412,238

UNITED STATES PATENT OFFICE 2,412,238

PRODUCTION CONTROL BOARD

Frank Lloyd Wassell, Westport, Conn., assignor to Georgene P. Wassell, Westport, Conn.

Application August 13, 1942, Serial No. 454,712

8 Claims. (Cl. 116—135)

The present invention relates to improvements in statistical control charts, particularly of the kind employing pegs or other markers for the purpose of tabulating and portraying data of various kinds.

A use to which the board contemplated by the present invention is particularly adapted is that of a digest of production in factories to the end of facilitating assembly of the various parts and expeditious delivery of the manufactured devices.

Other uses for which the device of the present invention is well adapted are various tabulations involving scheduling, machine loading, purchasing, production, assembly, tool allocation, sales statistics and in general comparative showings of all kinds, as well as many other uses, as will hereinafter be apparent.

It is an object of the present invention to provide a chart board adapted for a great variety of specific uses and which may be easily manipulated at will, as well as a device which may be repeatedly reused.

A further object is to provide a compact board which may be used individually or in series and which is simple in construction and durable in operation.

A more specific object and advantage of the invention is to provide a peg positioning board in which the pegs may be secured to the board by cords or the like, and in which the cords may be spring anchored at the interior or rear of the board so as to remain concealed when not in use.

In the accompanying drawings wherein a preferred embodiment of the present invention has been selected for exemplification:

Fig. 1 represents a plan view of a control board;

Fig. 2 is a horizontal section of the device illustrated in Fig. 1;

Fig. 3 is a vertical section of the device shown in Fig. 1;

Fig. 4 is an enlarged detail of means for anchoring the extensible cords;

Fig. 5 is an enlarged detail of the preferred manner of securing the pegs or other markers to the extremities of the cords;

Fig. 6 is a horizontal section similar to Fig. 2 but of a modified form of the invention;

Fig. 7 is a horizontal section similar to Figs. 2 and 6 but illustrating a double-faced modified board;

Fig. 8 is a fragmentary plan view of the board of Fig. 1 showing the installation of various signal strips; and Fig. 9 is a vertical sectional view of Fig. 8 taken through the signal strips.

Figure 10:
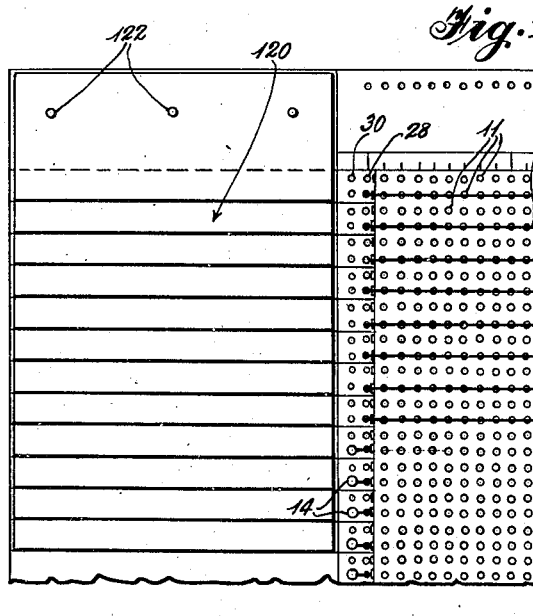
Fig. 10 is a fragmentary view similar to Fig. 1 but showing a combined visible card index and indicating board with a modified arrangement of pegs and cords.

Referring more particularly to the drawings where like numerals refer to like parts, the board indicated in its entirety by the numeral 10 in a preferred construction is formed of laminated sheets of fibrous material, but it may obviously be formed of any other material for durability and convenience of manipulation.

The working face of the board 10 is arranged to receive at its left-hand section 12 various sheets of descriptive matter relating to the situation to be charted or a visible card index showing a more complete record of the particular matter involved, the visible portion of the card being opposite the line for which it is the record. To the right thereof the major body portion of the board is made up of a series of apertures 11 disposed in horizontal and vertical alignment, each aperture being adapted to receive a peg 14. The pegs 14 may be of different colors to signify various denominations, units, etc. The pegs 14 are preferably provided with shoulders to limit their insertion into the board to provide means for holding the cords 26 hereinafter referred to close to the face of the board.

Space is provided above the aligned apertures for receiving further indicia which, if the board is used to portray factory production data, will usually comprise the scheduled delivery dates and dates for the completion of component units of the device to be manufactured.

Extending vertically of the board is a plurality of tapes or cords 16, each secured at its lower end by a peg 18 received in a selected hole of a row 20, and anchored at its upper end by means of a similar peg 22 received in a selected aperture of a row 24. A spring 25 is interposed between the cord 16 and one of its anchoring pegs so that the cord may be taut at all times. The purpose of the cord 16 is to divide the horizontal row of apertures into various groups or numbers, such as tens, for example.

Each of the indicating pegs 14 is secured to a tape or cord 26 in any suitable manner such as shown in Fig. 5, and at the left-hand side of the bank of apertures 11 is a separate vertical row of apertures 28 through which the cords 26 are passed to be anchored at the rear or concealed face of the board. Immediately to the left of the row of apertures 28 is a further row indicated at 30, each of the apertures of this row being in alignment with the horizontal rows and providing a point for depositing the pegs 14 when in unused or neutral position. It will be apparent that the apertures 11 provide at all times fixed positions for receiving indicating pegs 14 and attached cords 26. This construction has decided advantages over prior devices employing pins or clips which mutilate the board and are readily dislodged. It will be apparent that any given operation can be projected on the board by selectively positioning the pegs 14 in proper pockets and the cord 26 can be suitably positioned to show the progress or history of the operation.

Cords 26 are spring-tensioned so that they may be pulled through apertures 28 and stretched across the board, as desired. A convenient manner of anchoring the cords is best shown in Fig. 2 wherein a cord 26 is passed around guide members 32 positioned at opposite sides of an aperture 28, then looped through a ring 34 carried at an end of a tension spring 36 screwed or otherwise secured at one end of the board as at 38. A guide 40 which may be in the form of an individual ring is secured at the opposite end of the board and each cord 26 is passed around the guide 40 and thence doubled back and tied as at 42 to ring 34. It will be apparent that this gives a three to one ratio and it will be understood that any other desired ratio may be provided by appropriately rearranging the number and position of pulleys or guides.

In the modified construction shown in Fig. 6, the tapes or cords 46 are continuous, the rear face of the board supporting a tension spring 48 carrying a ring 50 through which a cord 46 is passed. In this instance, the vertical row of apertures at the right-hand side of the board is provided with guides 52 and the guides 32 at the aperture 28 are appropriately rearranged to suit the direction of the cord. The construction of Fig. 6 lends itself to a novel feature of the device in that the portion of the cord 46 at the right-hand side of peg 14 may be of a color, such as black, matching with the face of the board so as to inconspicuously blend into the board background, while the portion of the cord 46 at the left-hand side of peg 14 may be of a contrasting color, such as white, to clearly show the distended length of the cord on the working face of the board.

In the further modification of Fig. 7, a double board is provided and, as shown therein, the aggregate thickness may be materially reduced by providing a recess at the rear of the portion 12 of the board to receive the spring and pulley arrangement for anchoring the various cords. In the particular construction illustrated in Fig. 7, blocks 54 are carried at the ends of tension springs 56, each secured to an inside end wall of the board. Each block 54 is provided with a series of guides 58 opposed to stationary guides 60 around which a cord 66 is looped and fastened at its end to a block 54, as at 62.

It will be apparent that a very compact structure is thus provided so that the double-faced board of Fig. 7 readily lends itself for use in complex operations where a series of boards is necessary to portray a situation. A series of boards may conveniently be vertically pivoted on an upright standard or otherwise handled as leaves of a book.

A further feature of the invention is shown at Fig. 8 wherein signal strips or cards of various colors indicated at 70 are provided. Each of the strips or cards 70 is provided preferably with apertures mating with those of the board proper so that pegs 14 may be inserted through the strip and into an aperture 11. In addition, the strips or cards 70 are provided with further apertures 72 for the purpose of pegging the same to the board by small pegs 75. Such strips or cards may, if desired, carry further indicia and are of value in indicating special operations for emphasizing the importance of a particular phase of the charted situation and, of course, may be positioned at any part of the board and removed at will.

Another modified arrangement is shown in Fig. 10 wherein cords or tapes are provided for or used for alternate rows only thus leaving an adjoining row of holes or pockets for receiving pegs preferably of a color contrasting with the cord and the peg carried by it. In this arrangement, the pegs 114, which can be identical with the pegs 14 except for color, may denote an objective. For example, the pegs 114 may be used to project a schedule on a horizontal row of pockets according to date, quantity, etc., and the cord may then be pulled out in alignment with the horizontal row of pockets below and its peg 14 inserted in the proper pocket to show operation against the projection or approach to the objective.

Figure 11:
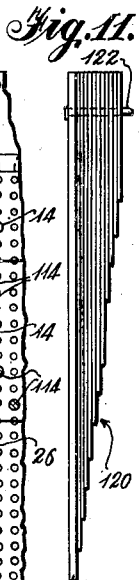
Fig. 11 is an edge view of the device of Fig. 10.

Figs. 10 and 11 also illustrate a further important feature of the invention residing in the combination of a visible card index and indicator board. According to this feature of the invention a series of visible index cards 120 are supported on elongated pins 122 at the left-hand side of the board with the visible edges thereof in alignment with one or more rows of horizontal pockets. In this manner the media carrying the descriptive matter to be recorded on the working face of the board can also carry additional individual information without interfering with the compactness and other utility of the device.

Figure 12:
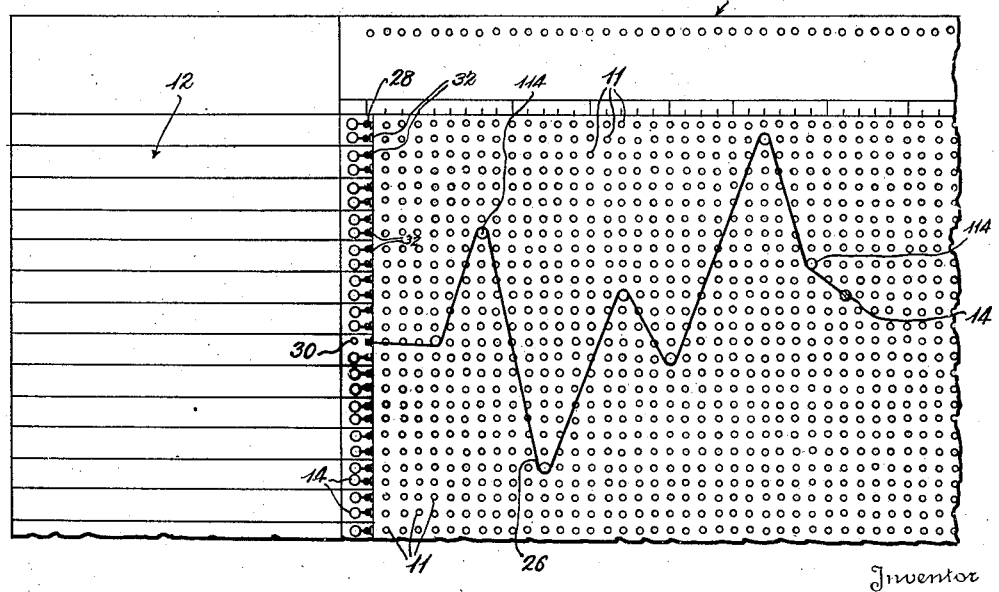
Fig. 12 is a fragmentary view similar to Fig. 1 but showing a further modified arrangement of pegs and a cord to represent a graph.

A novel use to which an indicator board of the invention may be put is shown in Fig. 12 wherein one of the cords or tapes 26, which may be of greater than conventional length if desired, is passed around a plurality of pegs 14 so positioned in various pockets that the cord will represent a graph in curved or straight lines as desired. Although only one such graph is shown, it will be apparent that several graphs may be portrayed on the same working surface but in such event it is preferable to employ different colored pegs for contrast.

It will be apparent that indicating boards such as contemplated by the invention may be employed individually or in series with the utmost efficiency to chart and control even the most complex factory operations and are of particular value for this purpose. The combination of the pocketed board, pegs and cord provides a fixed portion on the board for measurement by percentage, by numerical arrangement, or by date or a combination of date and percentage or date and numbers.

It will be understood that the specific structures herein illustrated and described are exemplary only and may be modified in many details in accordance with the principles of the invention as defined in the following claims.

The term flexible member in the following claims is intended to include tape, ribbon, wire, or any similar elongated means.

I claim:

1. In an indicating device, a pair of boards each having a plurality of peg receiving holes in one face thereof, said holes being positioned closely adjacent each other and being arranged in alignment with each other to form vertical and horizontal rows, said boards being secured together with said faces positioned to form the exterior faces of a board structure and being spaced from each other to provide a hollow board structure, a plurality of pegs provided with a shank portion fitting said holes in said board, for insertion into selected holes so as to resist removal therefrom, a plurality of flexible members each having one end attached to one of said pegs and extending to the interior of said board structure adjacent one side edge of each of said boards, spring means individual to each of said members positioned in the interior of said board structure for tensioning said members and withdrawing the same to the interior of said board structure upon removal of the corresponding peg from a hole in one of said boards, said flexible members being aligned with selected ones of said horizontal holes.

2. In an indicating device, a pair of boards each having a plurality of peg receiving holes in one face thereof, said holes being positioned closely adjacent each other and being arranged in alignment with each other to form vertical and horizontal rows, said boards being secured together with said faces positioned to form the exterior faces of a board structure and being spaced from each other to provide a hollow board structure, a plurality of pegs provided with a shank portion fitting said holes in said board, for insertion into selected holes so as to resist removal therefrom, a plurality of flexible members each having one end attached to one of said pegs and extending to the interior of said board structure adjacent one side edge of each of said boards, spring means individual to each of said members positioned in the interior of said board structure for tensioning said members and withdrawing the same to the interior of said board structure upon removal of the corresponding peg from a hole in one of said boards, said flexible members being aligned with selected ones of said horizontal holes, each of said boards having an indicia receiving portion along one side edge of said board, the indicia receiving portions for the respective boards being positioned at opposite ends of said board structure, said spring means for one of said boards being positioned adjacent one of said indicia receiving portions and the spring means for the other of said boards being positioned adjacent the other of said indicia receiving portions.

3. In an indicating device, a board having a plurality of peg receiving holes in one face thereof, said holes being positioned closely adjacent each other and being arranged in alignment with each other to form vertically and horizontally extending rows, a plurality of pegs each provided with a shank portion fitting said holes for insertion into selected holes so as to resist removal therefrom, a plurality of flexible members each being attached to one of said pegs and extending through said board to the rear of said board, the points of extension of said flexible members through said board being aligned with selected ones of said horizontal rows of holes, resilient means individual to each of said members and positioned at the rear of said board for tensioning said members, each of said resilient means being so constructed as to permit the pegs attached to the flexible members associated with said resilient means to be moved a substantial equal maximum extent from said points of extension of said flexible member through said board, said flexible members having a width not greater than the width of one of said horizontal rows of holes, said resilient means comprising elongated coil springs extending horizontally of said board each having one end engaging a flexible member and its other end attached to said board.

4. In an indicating device, a board having a plurality of peg receiving holes in one face thereof, said holes being positioned closely adjacent each other and being arranged in alignment with each other to form vertically and horizontally extending rows, a plurality of pegs each provided with a shank portion fitting said holes for insertion into selected holes so as to resist removal therefrom, a plurality of flexible members each having one end attached to one of said pegs and extending through said board to the rear of said board adjacent one side edge thereof, the points of extension of said flexible members through said board being aligned with selected ones of said horizontal rows of holes, resilient means individual to each of said members and positioned at the rear of said board for tensioning said members and withdrawing the same to the rear of the board upon removal of the corresponding peg from a hole in said board, each of said resilient means being so constructed as to permit the pegs attached to the flexible members associated with said resilient means to be moved a substantial equal maximum extent from said points of extension of said flexible members through said board, said flexible members having a width not greater than the width of one of said horizontal rows of holes, said resilient means comprising elongated coil springs extending horizontally of said board, each having one end engaging a flexible member and its other end attached to said board, said flexible members each being looped at the rear of said board and attached to said one end of said springs and to said board to provide for greater movement of the end of said flexible member attached to said peg than said one end of said spring.

5. In an indicating device, a board having a plurality of peg receiving holes in one face thereof, said holes being positioned closely adjacent each other and being arranged in alignment with each other to form vertically and horizontally extending rows, a plurality of pegs each provided with a shank portion fitting said holes for insertion into selected holes so as to resist removal therefrom, a plurality of flexible members each having one end attached to one of said pegs and extending through said board to the rear of said board adjacent one side edge thereof, the points of extension of said flexible members through said board being aligned with selected ones of said horizontal rows of holes, resilient means individual to each of said members and positioned at the rear of said board for tensioning said members and withdrawing the same to the rear of the board upon removal of the corresponding peg from a hole in said board, each of said resilient means being so constructed as to permit the pegs attached to the flexible members associated with said resilient means to be moved a substantial equal maximum extent from said points of extension of said flexible members through said board, said flexible members having a width not greater than the width of one of said horizontal rows of holes, and a plurality of cards of materially smaller area than the area of said board and provided with holes spaced in accordance with the spacing of the holes on said board, whereby said cards may be held in position on said board by said pegs.

6. In an indicating device, a board having a plurality of peg receiving holes in one face thereof, said holes being positioned closely adjacent each other and being arranged in alignment with each other to form vertically and horizontally extending rows, a plurality of pegs each provided with a shank portion fitting said holes for insertion into selected holes so as to resist removal therefrom, a plurality of flexible members each having one end attached to one of said pegs and extending through said board to the rear of said board adjacent one side edge thereof, the points of extension of said flexible members through said board being aligned with selected ones of said horizontal rows of holes, resilient means individual to each of said members and positioned at the rear of said board for tensioning said members and withdrawing the same to the rear of the board upon removal of the corresponding peg from a hole in said board, each of said resilient means being so constructed as to permit the pegs attached to the flexible members associated with said resilient means to be moved a substantial equal maximum extent from said points of extension of said flexible members through said board, said flexible members having a width not greater than the width of one of said horizontal rows of holes, and a plurality of elongated cards having a width covering a pair of adjacent horizontal rows of holes, said cards being provided with holes spaced in accordance with the spacing of the holes on said board, whereby said cards may be held in position on said board by said pegs to cover at least a portion of a pair of horizontal rows of holes.

7. Indicating apparatus comprising a board member having a plurality of indicia receiving spaces adjacent one side thereof, extensible indicating means carried by the board member adjacent each of said indicia spaces and of a color contrasting with the color of the board, yielding means to maintain the extensible means normally in a retracted position, a plurality of series of holes in the board member aligned with each of the respective indicia receiving spaces, pegs secured to the ends of the extensible means and adapted to be positioned removably in the holes of the respective series of holes, and a second indicating means associated with each of the indicia receiving spaces and adapted to be positioned removably in the holes of the respective series of holes for providing information relative to said extensible indicating means.

8. Indicating apparatus comprising a board member having a plurality of visible index cards, means to mount the cards movably positioned on said board member adjacent one side of the board member with the visible edges exposed to form a plurality of indicia receiving spaces adjacent the said one side of said board member, extensible indicating means carried by the board member adjacent each of said indicia spaces and of a color contrasting with the color of the board, yielding means to position the extensible means normally in a retracted position, a series of holes in the board member comprising a pair of rows of holes aligned with each of the respective indicia receiving spaces, pegs secured to the ends of the extensible means and adapted to be positioned removably in one of the rows of holes of the respective series of holes, and an indicating peg for each of the indicia receiving spaces and adapted to be positioned removably in the other row of said respective series of holes to provide information relative to said indicia receiving spaces, said cards having normally covered portions for receiving information relative to the indicia receiving spaces thereof.

FRANK LLOYD WASSELL.